US 8,718,427 B2

(12) United States Patent
Paschal et al.

(10) Patent No.: US 8,718,427 B2
(45) Date of Patent: *May 6, 2014

(54) FIBER OPTIC CABLES AND METHODS FOR FORMING THE SAME

(75) Inventors: Kevin Paschal, Claremont, NC (US); Nathan Hatch, Claremont, NC (US)

(73) Assignee: CommScope, Inc. of North Carolina, Hickory, NC (US)

(*) Notice: Subject to any disclaimer, the term of this patent is extended or adjusted under 35 U.S.C. 154(b) by 253 days.

This patent is subject to a terminal disclaimer.

(21) Appl. No.: 12/793,877

(22) Filed: Jun. 4, 2010

(65) Prior Publication Data

US 2010/0239216 A1 Sep. 23, 2010

Related U.S. Application Data

(63) Continuation of application No. 11/412,616, filed on Apr. 27, 2006, now Pat. No. 7,742,667.

(60) Provisional application No. 60/688,492, filed on Jun. 8, 2005, provisional application No. 60/688,493, filed on Jun. 8, 2005.

(51) Int. Cl.
*G02B 6/44* (2006.01)

(52) U.S. Cl.
USPC ............................................ 385/109; 385/101

(58) Field of Classification Search
USPC ................................................ 385/109, 101
See application file for complete search history.

(56) References Cited

U.S. PATENT DOCUMENTS

| | | | |
|---|---|---|---|
| 4,337,923 A | 7/1982 | Smith | |
| 4,447,121 A * | 5/1984 | Cooper et al. | 385/87 |
| 4,515,435 A * | 5/1985 | Anderson | 385/103 |
| 4,595,839 A | 6/1986 | Braun et al. | |
| 4,626,067 A | 12/1986 | Watson | |
| 4,648,688 A * | 3/1987 | Ashman et al. | 385/85 |
| 4,690,498 A | 9/1987 | Priaroggia | |
| 4,893,893 A * | 1/1990 | Claxton et al. | 385/108 |
| 4,949,894 A | 8/1990 | Winter et al. | |
| 5,125,063 A * | 6/1992 | Panuska et al. | 385/113 |
| 5,171,802 A * | 12/1992 | Salazar | 526/225 |
| 5,231,685 A | 7/1993 | Hanzawa et al. | |
| 5,600,097 A | 2/1997 | Bleich et al. | |

(Continued)

FOREIGN PATENT DOCUMENTS

| | | |
|---|---|---|
| EP | 1039323 A1 | 9/2000 |
| EP | 1310814 A1 | 5/2003 |

(Continued)

OTHER PUBLICATIONS

US Conec® Ltd., "MTP® Housing Assembly Procedure for Cabled Multifiber Optical Ribbon," EG-0024, Sep. 2001, 4 pages.

(Continued)

*Primary Examiner* — Charlie Peng
*Assistant Examiner* — Peter Radkowski
(74) *Attorney, Agent, or Firm* — Myers Bigel Sibley & Sajovec, PA

(57) ABSTRACT

A loose tube optical fiber cable includes at least one cable unit. Each cable unit includes a plurality of loose, non-buffered optical fibers, a strength yarn at least partially surrounding the non-buffered optical fibers, and a jacket surrounding the strength yarn and the non-buffered optical fibers.

14 Claims, 7 Drawing Sheets

(56) References Cited

U.S. PATENT DOCUMENTS

| | | | |
|---|---|---|---|
| 5,611,016 A * | 3/1997 | Fangmann et al. | 385/100 |
| 5,630,003 A | 5/1997 | Arroyo | |
| 5,684,910 A | 11/1997 | Chapin et al. | |
| 5,689,090 A | 11/1997 | Bleich et al. | |
| 5,739,473 A | 4/1998 | Zerbs | |
| 5,740,295 A | 4/1998 | Kinard et al. | |
| 5,745,627 A | 4/1998 | Arroyo et al. | |
| 5,751,879 A | 5/1998 | Graham et al. | |
| 5,806,175 A | 9/1998 | Underwood | |
| 5,838,864 A | 11/1998 | Patel et al. | |
| 5,857,046 A | 1/1999 | Barkus et al. | |
| 5,857,051 A | 1/1999 | Travieso et al. | |
| 5,878,182 A | 3/1999 | Peckham | |
| 5,913,003 A | 6/1999 | Arroyo et al. | |
| RE36,592 E | 2/2000 | Giebel et al. | |
| 6,019,521 A | 2/2000 | Manning et al. | |
| 6,108,475 A | 8/2000 | Chapin et al. | |
| 6,160,939 A | 12/2000 | Sheu | |
| 6,178,278 B1 | 1/2001 | Keller et al. | |
| 6,185,351 B1 | 2/2001 | Daneshvar et al. | |
| 6,205,277 B1 | 3/2001 | Mathis et al. | |
| 6,256,438 B1 | 7/2001 | Gimblet | |
| 6,264,374 B1 | 7/2001 | Selfridge et al. | |
| 6,317,542 B1 | 11/2001 | Hardwick et al. | |
| 6,317,543 B1 | 11/2001 | Sheu | |
| 6,324,324 B1 | 11/2001 | Dixon et al. | |
| 6,464,408 B1 | 10/2002 | Nolan | |
| 6,485,196 B2 | 11/2002 | Shiino et al. | |
| 6,491,445 B1 | 12/2002 | Abendschein | |
| 6,567,592 B1 | 5/2003 | Gimblet et al. | |
| 6,575,640 B2 | 6/2003 | Connelly et al. | |
| 6,738,555 B1 * | 5/2004 | Cooke et al. | 385/136 |
| 6,764,221 B1 * | 7/2004 | de Jong et al. | 385/55 |
| 6,775,444 B1 * | 8/2004 | Hurley | 385/104 |
| 6,796,721 B2 | 9/2004 | Matsumoto et al. | |
| 6,807,347 B2 | 10/2004 | McAlpine et al. | |
| 6,848,838 B2 | 2/2005 | Doss et al. | |
| 6,870,996 B2 | 3/2005 | Doss et al. | |
| 6,922,511 B2 | 7/2005 | Rhoney et al. | |
| 6,934,451 B2 * | 8/2005 | Cooke et al. | 385/100 |
| 6,987,916 B2 | 1/2006 | Storaasli | |
| 7,010,206 B1 * | 3/2006 | Baker et al. | 385/128 |
| 7,537,393 B2 * | 5/2009 | Anderson et al. | 385/54 |
| 2002/0164130 A1 * | 11/2002 | Elkins et al. | 385/87 |
| 2003/0068147 A1 | 4/2003 | Nechitailo | |
| 2003/0091307 A1 | 5/2003 | Hurley et al. | |
| 2003/0113079 A1 | 6/2003 | Storaasli | |
| 2004/0052474 A1 * | 3/2004 | Lampert et al. | 385/78 |
| 2004/0126069 A1 | 7/2004 | Jong et al. | |
| 2005/0053343 A1 | 3/2005 | Lee | |
| 2005/0196113 A1 | 9/2005 | Hurley et al. | |
| 2005/0244115 A1 | 11/2005 | Bocanegra et al. | |
| 2006/0045452 A1 | 3/2006 | Williams | |
| 2006/0093278 A1 * | 5/2006 | Elkins et al. | 385/76 |
| 2006/0159407 A1 | 7/2006 | Kachmar | |
| 2006/0159408 A1 | 7/2006 | Kim et al. | |
| 2006/0280413 A1 | 12/2006 | Paschal et al. | |
| 2007/0081774 A1 | 4/2007 | Suzuki et al. | |
| 2007/0183727 A1 | 8/2007 | Strack et al. | |
| 2008/0267569 A1 | 10/2008 | Ginocchio et al. | |

FOREIGN PATENT DOCUMENTS

| | | | | |
|---|---|---|---|---|
| FR | 2 296 190 | | 8/2000 | |
| JP | 57084405 A | * | 5/1982 | G02B 5/16 |
| JP | 60-41011 | | 3/1985 | |
| JP | 63092908 A | * | 4/1988 | G02B 6/36 |
| JP | 63167324 | | 7/1988 | |
| JP | 05-142454 | | 6/1993 | |
| JP | 6118282 | | 4/1994 | |
| JP | 6347670 | | 12/1994 | |
| JP | 8005868 | | 1/1996 | |
| JP | 09-243886 | | 9/1997 | |
| JP | 2000-235132 | | 8/2000 | |
| JP | 2001525557 T | | 12/2001 | |
| JP | 2002148480 | | 5/2002 | |
| JP | 2002148481 | | 5/2002 | |
| JP | 2003-140013 | | 5/2003 | |
| JP | 2005-208430 | | 8/2005 | |
| WO | WO 99/28773 A2 | | 6/1999 | |
| WO | WO 01/33276 | | 5/2001 | |

OTHER PUBLICATIONS

US Conec® Ltd., "MTP® Termination Procedure for Cabled Multifiber Optical Ribbon," EG-0023, Jul. 2001, 7 pages.

International Search Report and the Written Opinion of the International Searching Authority for PCT Application No. PCT/US2006/018027 dated Sep. 28, 2006.

Office Action corresponding to Canadian Patent Application No. 2,610,858 dated Feb. 17, 2011; 2 pages.

JP Office Action corresponding to Japanese Patent Application No. 2008-515712 dated Oct. 22, 2010; 3 pages.

EPO Communication corresponding to Patent Application No. 06 752 467.8 dated Dec. 15, 2010; 5 pages.

Office Action from Canadian Patent Office Corresponding to Canadian Application No. 2,610,858; Dated Sep. 12, 2011; 3 pages.

Office Action corresponding to Japanese Patent Application No. 2008-515712; Dispatch Date: Apr. 28, 2011; 4 pages.

Canadian Office Action Corresponding to Canadian Application No. 2,610,858; Dated: Dec. 21, 2011; 4 pages.

European Search Report Corresponding to European Patent Application No. 10 18 4040; Dated: Nov. 7, 2012; 7 Pages.

Office Action corresponding to Japanese Patent Application No. 2008-515712; Dispatch Date: Feb. 10, 2011; 4 pages.

* cited by examiner

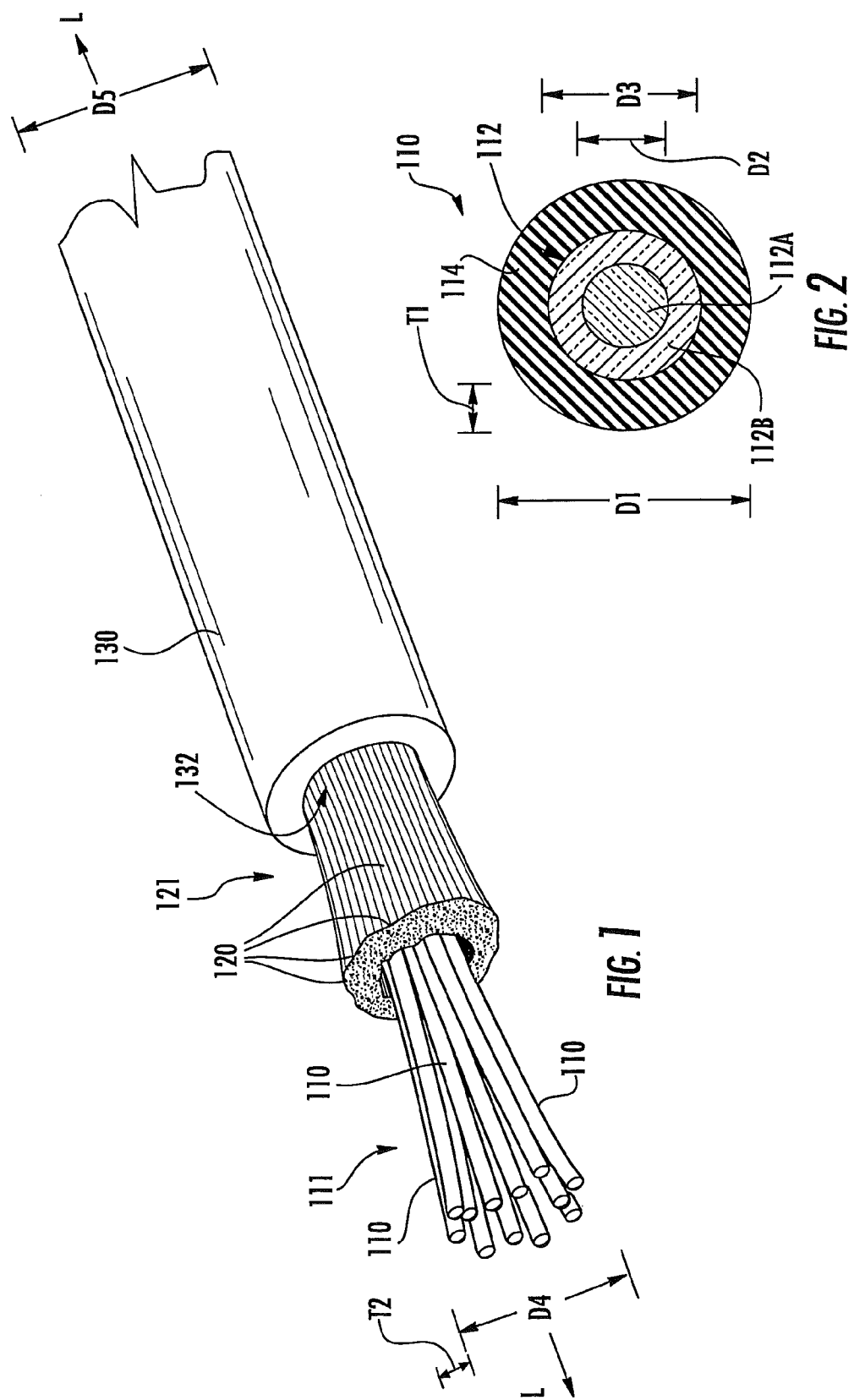

FIBER OPTIC CABLES AND METHODS FOR FORMING THE SAME

RELATED APPLICATIONS

This application claims priority under 35 U.S.C. §120 as a continuation of U.S. patent application Ser. No. 11/412,616, filed Apr. 27, 2006, now U.S. Pat. No. 7,742,667, which in turn claims the benefit of priority from U.S. Provisional Patent Application No. 60/688,492, filed Jun. 8, 2005 and U.S. Provisional Patent Application No. 60/688,493, filed Jun. 8, 2005, the disclosures of each of which are incorporated herein by reference in their entireties.

FIELD OF THE INVENTION

The present invention relates to transmission cables and, more particularly, to fiber optic transmission cables and methods for forming the same.

BACKGROUND OF THE INVENTION

Arrayed optical fiber connectors have traditionally been applied to ribbon optical fiber cables and cordage, tight-buffered cables, and loose tube cables. Each of these cables has inherent disadvantages with respect to cable cost, cable performance and connectorization methods.

Ribbon cables may be more expensive than other cable designs and may suffer from preferential bending. They may also have reduced optical performance due to the cable structure. Additionally, multiple ribbons may require furcation tubing when broken out to multiple connectors.

Tight buffered cables are typically larger cables, decreasing the packing density of the optical fiber and negatively impacting the handling considerations for this type of cable assembly. Additional labor may be involved with connectivity, as the individual tight buffers often must be stripped and then protected with furcation tubing. Ribbonization of the loose optical fibers may also be required prior to application of the arrayed optical fiber connector.

Loose tube cables offer an advantage with regard to optical performance, cable size and cable cost. However, traditionally, the optical fibers must be protected with furcation tubing. Also, ribbonization of the loose fibers may also be required prior to application of the arrayed optical fiber connector.

SUMMARY OF THE INVENTION

According to embodiments of the present invention, a loose tube optical fiber cable includes at least one cable unit. Each cable unit includes a plurality of loose, non-buffered optical fibers, a strength yarn at least partially surrounding the non-buffered optical fibers, and a jacket surrounding the strength yarn and the non-buffered optical fibers.

According to some embodiments, the non-buffered optical fibers each have a diameter in the range of from about 235 to 265 μm.

According to some embodiments, each cable unit is constructed such that the non-buffered optical fibers thereof float in the jacket thereof.

According to some embodiments, the jacket of each cable unit has an outer diameter in the range of from about 2.75 to 3.25 mm.

According to some embodiments, the cable further includes an outer strength yarn surrounding at least a portion of the at least one cable unit, and an outer jacket surrounding the outer strength yarn and the at least one cable unit.

According to some embodiments, the at least one cable unit includes a plurality of the cable units, and the cable further includes an outer jacket surrounding the jackets of the plurality of the cable units.

According to further embodiments of the present invention, a connectorized cable assembly includes a loose tube optical fiber cable including at least one cable unit and an optical fiber connector installed on the at least one cable unit. Each cable unit includes a plurality of loose, non-buffered optical fibers, a strength yarn at least partially surrounding the non-buffered optical fibers, and a jacket surrounding the strength yarn and the non-buffered optical fibers.

According to method embodiments of the present invention, a method for forming a loose tube optical fiber cable includes forming at least one cable unit including a plurality of loose, non-buffered optical fibers, a strength yarn at least partially surrounding the non-buffered optical fibers, and a polymeric jacket surrounding the strength yarn and the non-buffered optical fibers.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 1 is a cutaway perspective view of a cable in accordance with embodiments of the present invention.

FIG. 2 is a cross-sectional view of a non-buffered optical fiber forming a part of the cable of FIG. 1.

DETAILED DESCRIPTION OF EMBODIMENTS OF THE INVENTION

Figure 3A:
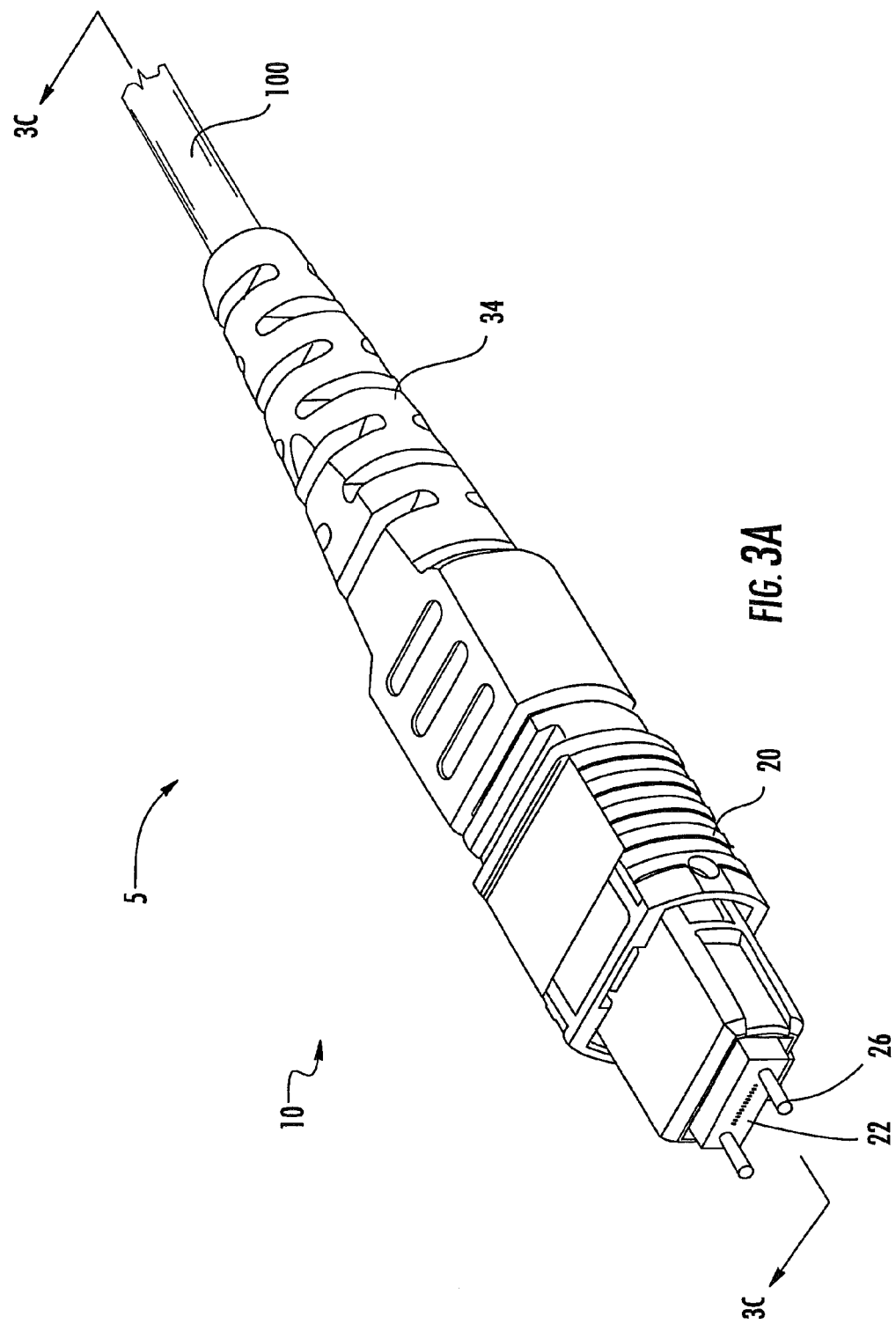
FIG. 3A is a front perspective view of a connectorized cable assembly including the cable of FIG. 1 in accordance with embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to embodiments of the present invention, a loose tube optical fiber cable is provided. The cable may provide advantages of loose tube cabling and/or reduce or eliminate certain cable assembly labor and cost as may typically be required with other fiber optic cabling types and solutions.

Figure 3B:
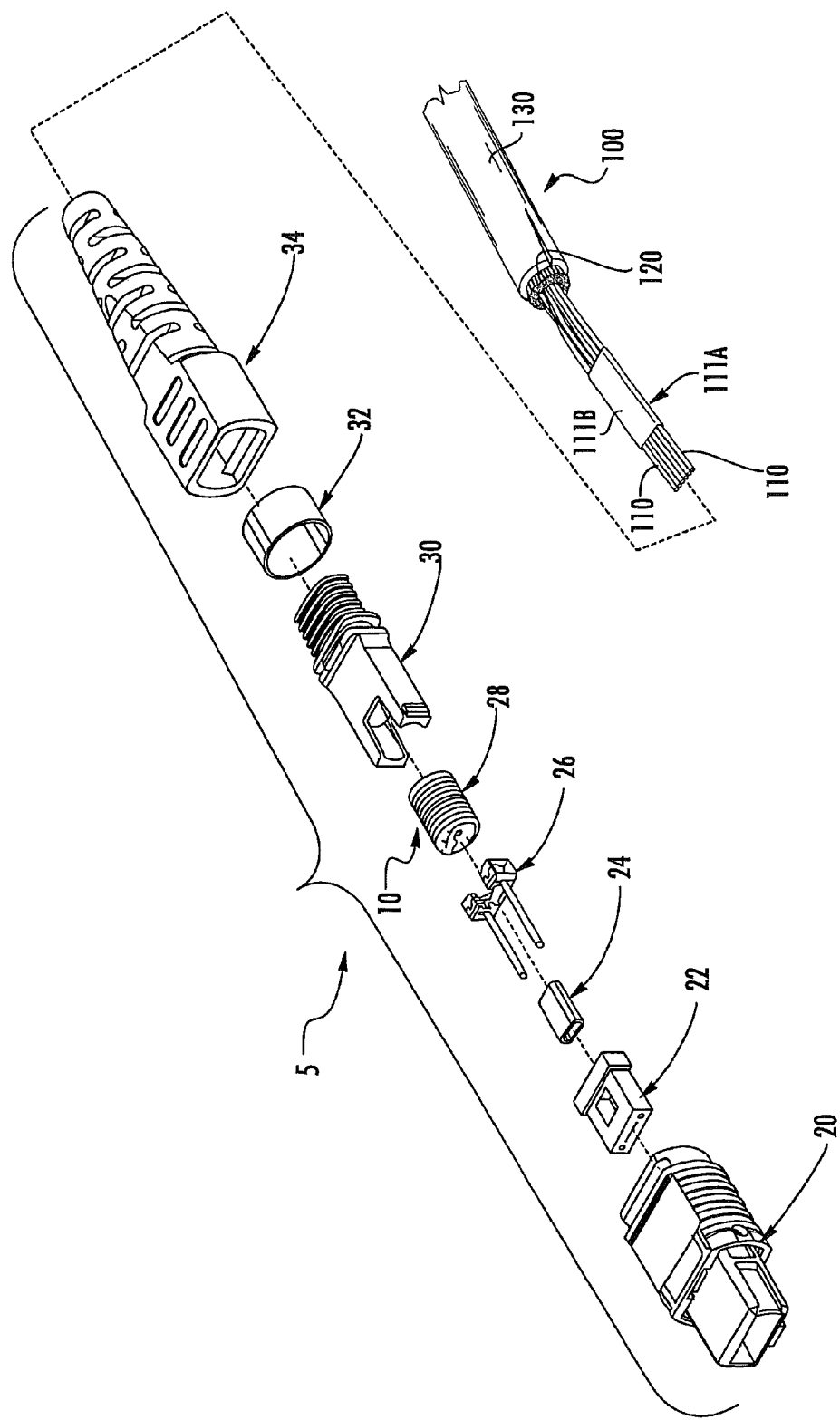
FIG. 3B is an exploded, front perspective view of the connectorized cable of FIG. 3A.
Figure 3C:
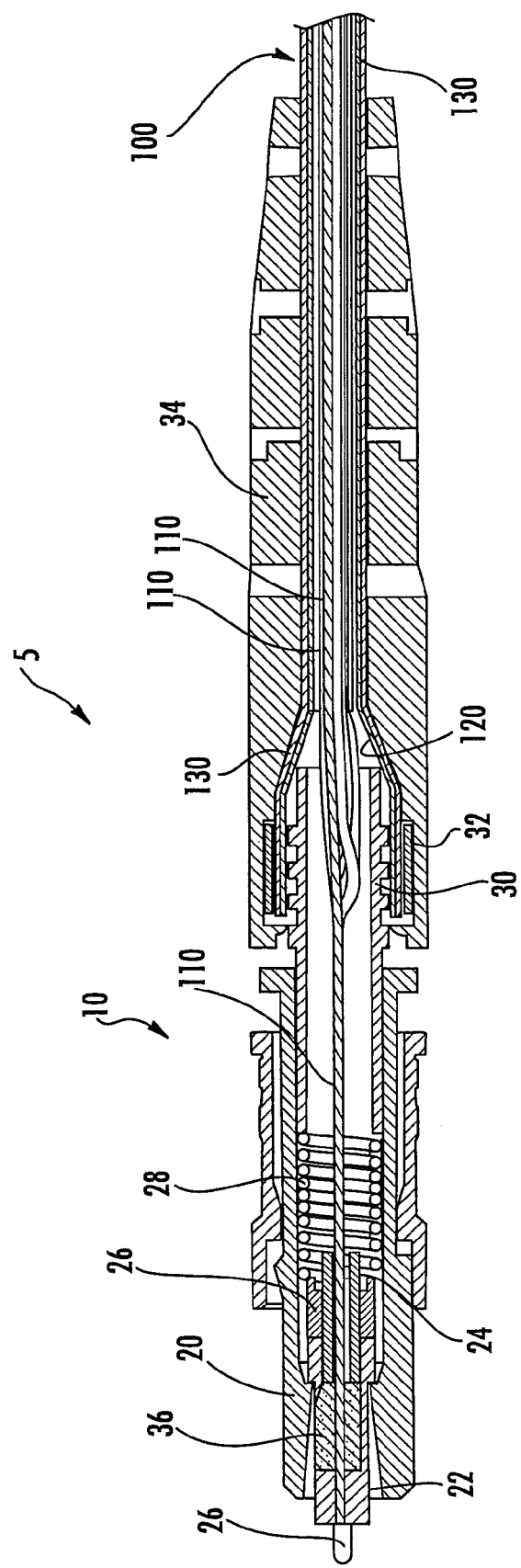
FIG. 3C is a cross-sectional view of the connectorized cable of FIG. 3A taken along the line 3C-3C of FIG. 3A.

With reference to FIG. 1, a cable 100 according to embodiments of the present invention is shown therein. The cable 100 includes generally a plurality of non-buffered optical fibers 110, a plurality of strength yarns 120, and a protective jacket 130. According to some embodiments and as illustrated, the cable 100 is round in cross-section and the foregoing groups of components are substantially concentrically positioned about and extend together along a length axis L-L. The cable 100 may be combined with a connector assembly 10 to form a connectorized cable 5 as shown in FIGS. 3A-3C. These components will be described in more detail below.

As shown, the cable 100 includes a bundle 111 of twelve (12) non-buffered optical fibers 110. According to some embodiments, the optical fibers 110 are loose with respect to one another so that they have no particular, fixed relative orientation.

An exemplary one of the optical fibers 110 is shown in cross-section in FIG. 2. The optical fiber 110 includes a glass fiber 112, which includes a glass core 112A and a surrounding glass cladding 112B. The glass fiber 112 may be constructed in any suitable manner. For example, each of the core 112A and the cladding 112B may include one or more concentric segments or layers, may be doped, etc. The glass fiber 112 may be formed of any suitable materials and using any suitable methods.

Referring again to FIG. 2, in the optical fiber 110, a coating layer 114 surrounds the cladding 112B. The coating layer 114 provides environmental protection for the glass fiber 112. As illustrated, the coating layer 114 consists of a single coating layer; however, multiple concentric layers may be applied to form the overall layer 114. According to some embodiments, the coating layer 114 is formed of a UV light-cured acrylate. The coating layers 114 of the respective optical fibers 110 may have different colors for color-coding purposes.

According to some embodiments and as illustrated, the optical fiber 110 is an optical fiber constructed as commonly referred to as a "bare optical fiber" or a "non-buffered optical fiber". According to some embodiments, the overall diameter D1 of the optical fiber 110 is in the range of from about 235 to 265 μm. According to some embodiments, the thickness T1 of the coating layer 114 is no greater than about 70.5 μm. According to some embodiments, the overall diameter D1 is between about 235 to 265 μm and the thickness T1 of the coating layer 114 is no greater than about 70.5 μm. According to some embodiments, the diameter D2 of the core 112A is between about 6 and 64 μm and the diameter D3 of the cladding 112B is between about 115 and 135 μm.

As shown, the cable 100 further includes a bundle 121 of the strength yarns 120 at least partially surrounding the optical fiber bundle 111. The strength yarns 120 may be formed of any suitable material. According to some embodiments, the strength yarns 120 are aramid fibers. Other suitable materials may include fiberglass or polyester. According to some embodiments, the strength yarns 120 each have a denier in the range of from about 250 to 3000. According to some embodiments, the strength yarn bundle 121 includes between about 2 and 10 ends or strands of the strength yarns 120 (each of which may include hundreds of filaments).

The jacket 130 surrounds the yarn bundle 121 and the optical fiber bundle 111, which reside in a longitudinal passage 132 defined in the jacket 130. The jacket 130 may be formed of any suitable material such as a polymeric material. According to some embodiments, the jacket 130 is formed of a thermoplastic polymer. Suitable polymeric materials may include PVC, PVDF, or FRPE. The jacket 130 may be molded or extruded over the fiber bundle 111 and the strength yarn bundle 121. According to some embodiments, the thickness T2 of the jacket 130 is between about 0.20 and 1.0 mm.

According to some embodiments, the inner diameter D4 of the jacket passage 132 is greater than the combined cross-sectional diameter of the optical fiber bundle 111 and the strength yarn bundle 121 so that at least the optical fibers 110 are loose and able to float within the passage 132 (i.e., move freely with respect to the jacket 130). According to some embodiments, both the optical fibers 110 and the strength yarns 120 are loose and can float within the passage 132 (i.e., can move freely with respect to the jacket 130). Thus, at least a portion of the volume of the passage 132 is not filled by the optical fibers 110 or the strength yarns 120 to allow movement of the optical fibers 110 and the strength yarns 120 within the passage 132. According to some embodiments, at least 30% of the volume of the passage 132 is not filled by the optical fiber bundle 111 and the strength yarn bundle 121 (i.e., the cross-sectional area of the passage 132 exceeds the combined total cross-sectional area of the optical fiber bundle 111 and the strength yarn bundle 121 by at least 30%). According to some embodiments, between about 50 and 60% of the volume of the passage 132 is not filled by the bundles 111, 121 (i.e., the cross-sectional area of the passage 132 exceeds the combined total cross-sectional area of the bundles 111, 121 by between about 50 and 60%). The cable 100 may be referred to as a "loose tube cable".

According to some embodiments, the cable 100 has an overall outer diameter D5 of between about 1.5 and 4 mm. According to some embodiments, the outer diameter D5 is between about 2.75 and 3.25 mm. A cable 100 having an outer diameter D5 in this latter range may be generally regarded as a 3 mm cable.

Suitable apparatus and methods for forming the cable 100 will be apparent to those of skill in the art. The optical fiber bundle 111 and the strength yarn bundle 121 may be stranded together and the jacket 130 then molded or extruded thereover. The optical fibers 110 may be helically stranded (e.g., using a reverse oscillating or S-Z technique). The cable 100 may then be packaged (e.g., wound onto a roll) or cut to lengths. The cable 100 is thus premanufactured as illustrated. The cable 100 may be packaged and used as a stand alone cable, or may be incorporated as a cable unit or subunit of a larger cable such as described below.

The cable 100 may provide a number of advantages. The cable 100 may permit direct connectivity to a connector such as an arrayed optical fiber connector (e.g., a multi-fiber push-on (MPO) optical fiber connector). The strength yarns 120 may provide strain relief at the connector. The loose tube construction and round shape may provide for improved optical performance, cable size, cable cost, handling and reliability characteristics. The cable may have a reduced diameter so that its space requirements are better suited for cabinets, cable trays, ducts, etc. The cable may have a reduced weight, which may reduce installation forces on the cable and provide easier handling. The cable may provide improved robustness, thereby providing a safety margin against standard requirements. The loose tube cable may reduce issues such as preferential bend radius, kink and crush resistance. Because the optical fibers 110 are non-buffered, the connector may be installed without requiring that a tight buffer layer first be stripped from the fibers (e.g., in the field). The premanufactured cable 100 may enable direct connection of the optical fibers 110 to a connector with strain relief without requiring the use of furcation tubing, supplemental strength yarns, etc. Thus, the total assembly cost may be reduced by reducing the complexity of the connectorization process.

With reference to FIGS. 3A-3C, the cable 100 may be terminated with a connector assembly 10 to form a connectorized cable assembly or cordage 5 as shown therein. The connector assembly 10 is exemplary and other suitable connectors may be employed. The connector assembly 10 includes a front housing 20, a ferrule 22, a ferrule boot 24, a pin clip 26, a spring 28, a rear housing 30, a crimp ring 32, and a strain relief boot 34. As shown in FIG. 3C, the fibers 110 are secured in the ferrule by epoxy 36. As also shown in FIG. 3C, the strength yarns 120 are secured directly to the connector assembly 10 by crimping the strength yarns 120 between the jacket 130 and the connector rear housing 30 using the crimp ring 32. In this way, the strength yarns 120 provide strain relief. The connector assembly 10 is mounted directly on the cable 100 and the round jacket 130 without the use of furcation tubing, etc. If desired, the relatively thin coating layers 114 may be stripped or washed from the end portions of the respective glass fibers 112; however, it is not necessary for the installer to strip a relatively thick tight buffer coating (for example, as may be present on 900 µm buffered optical fibers). According to some embodiments, the connector assembly and/or the method for installing the connector assembly include a connector assembly and/or method as disclosed in co-assigned U.S. Provisional Patent Application Ser. No. 60/688,492, filed Jun. 8, 2005, the disclosure of which is incorporated herein by reference. According to some embodiments, an end segment 111A (FIG. 3B) of the fiber bundle 111 within the housings 20, 30 is ribbonized such that the portions of the fibers 110 therein are arranged in a side-by-side, single row configuration. The segment 111A may be temporarily or permanently retained in the ribbonized configuration by a strip of tape or adhesive 111B.

According to some embodiments, the connector cable assembly 5 is a cordage including a length of the cable 100 and a respective connector assembly 10 installed on either end of the cable 100. The two connector assemblies 10 may be configured the same or differently from one another. According to some embodiments, the strength yarns 120 are crimped or otherwise secured directly to both connector assemblies. That is, the strength yarns 120 extend continuously from one connector assembly 10 to the other and may provide strain relief at both connector assemblies.

Figure 4:
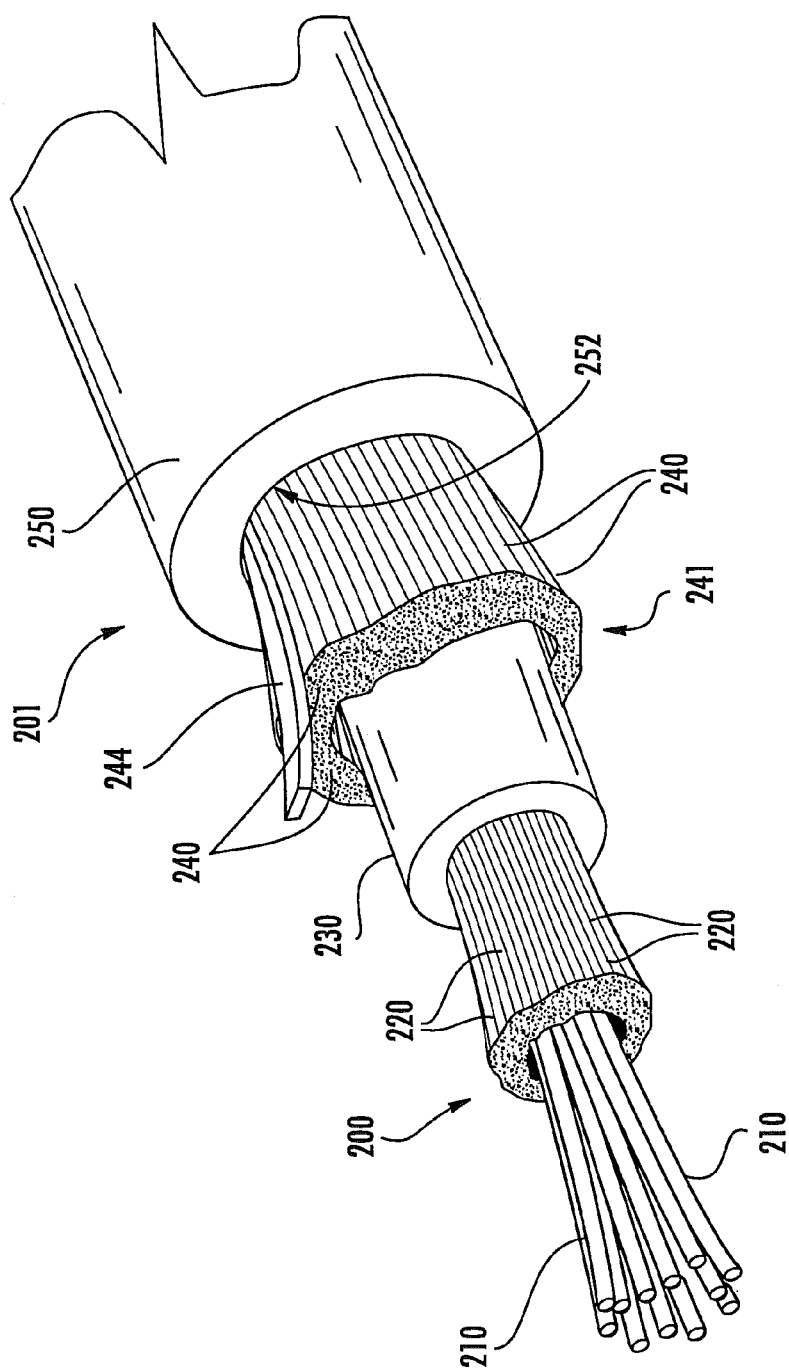
FIG. 4 is a cutaway perspective view of a cable in accordance with further embodiments of the present invention.

With reference to FIG. 4, a cable 201 according to further embodiments of the present invention is shown therein. The cable 201 includes a cable unit 200 constructed in the same manner as the cable 100 and including optical fibers 210, strength yarns 220, and a jacket 230. A bundle 241 of outer strength yarns 240 surrounds the jacket 230 (which may be referred to as the "inner jacket") of the cable unit 200. An outer jacket 250 defines a passage 252 and surrounds the yarn bundle 241 and the cable unit 200. A rip cord 244 also extends through the passage 252. According to some embodiments, the outer jacket 250 fits loosely about the strength yarn bundle 241 so that the cable unit 200 and the strength yarns 240 float in the jacket passage 252.

The cable unit 200 of the cable 201 may be connectorized in the same manner as described above. The strength yarns 240 and the outer jacket 250 may provide additional tensile strength for the cable 201 and protection for the optical fibers 210.

The strength yarns 240 may be constructed as described above for the strength yarns 120. The outer jacket 250 may be formed as described above for the jacket 130. According to some embodiments, the thickness of the outer jacket 250 is between about 0.40 and 1.0 mm.

Figure 5:
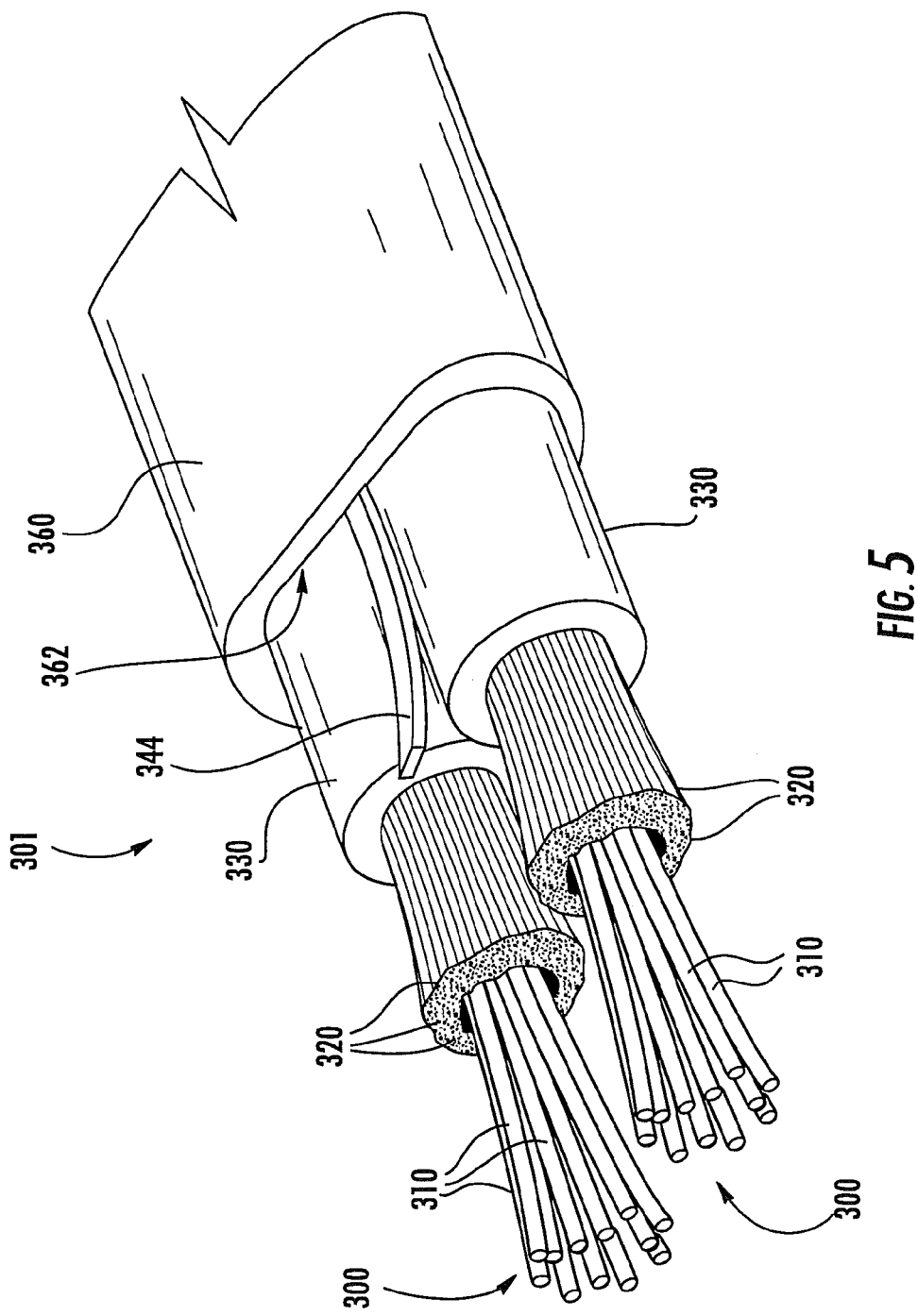
FIG. 5 is a cutaway perspective view of a cable in accordance with further embodiments of the present invention.

With reference to FIG. 5, a cable 301 according to further embodiments of the present invention is shown therein. The cable 301 includes two cable units 300. Each of the cable units 300 is constructed in the same manner as the cable 100 and includes optical fibers 210, strength yarns 220, and a jacket 330 (which may be referred to as the "inner jacket"). An outer jacket 360 defines a passage 362 and surrounds the cable units 300. A rip cord 344 also extends through the passage 362. The cable units 300 may extend in parallel as shown. Alternatively, the cable units 300 may be helically stranded (e.g., using a reverse oscillating or S-Z technique). The jacket 360 may be constructed as described above for the jacket 130. According to some embodiments, the outer jacket 360 has a thickness of between about 0.30 and 1.0 mm. According to some embodiments, the outer jacket 360 fits loosely about the cable units 300 so that the cable units 300 float in the outer jacket 360. Talc powder or other lubricant may be placed in the outer jacket passage 362 to inhibit bonding between the jackets 360 and 330.

The cable 301 can be used in the same manner as described above. However, the cable 301 provides twenty-four (24) optical fibers. Each of the cable units 300 can be broken out of the cable 301 and connectorized with a respective connector.

Figure 6:
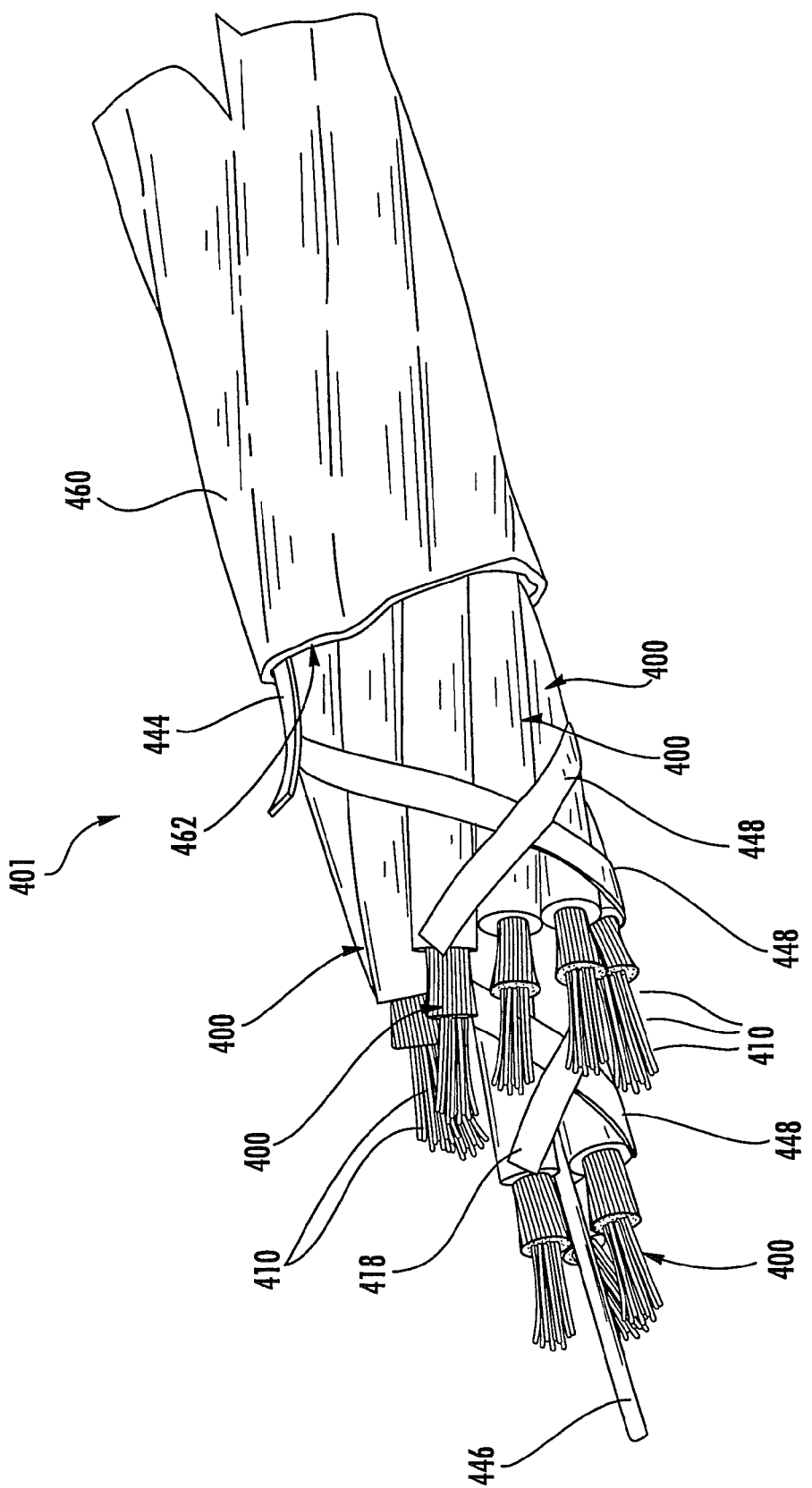
FIG. 6 is a cutaway perspective view of a cable in accordance with further embodiments of the present invention.

With reference to FIG. 6, a cable 401 according to further embodiments of the present invention is shown therein. The cable 401 includes twelve (12) cable units 400 to provide a total of 144 non-buffered optical fibers 410. Each cable unit 400 is constructed in the same manner as the cable units 300. An outer jacket 460 defines a passage 462 and surrounds the cable units 400. A rip cord 444 also extends through the passage 462. Additionally, a glass reinforced polymer (GRP) fiberglass rod 446 extends through the jacket passage 462. Binding tapes 448 are helically wrapped about the cable units 400 to maintain the cable units 400 in position during manufacture. The cable units 400 may be helically stranded (e.g., using a reverse oscillating or S-Z technique). The jacket 460 may be formed as described above for the jacket 130. According to some embodiments, the outer jacket 460 has a thickness of between about 0.30 and 1.0 mm. According to some embodiments, the cable units 400 fit loosely in the jacket 460 so that the cable units 400 float in the passage 462. Talc powder or other suitable lubricant may be provided in the passage 462 to inhibit bonding between the outer jacket 460 and the respective jackets of the cable units 400.

The cable 401 may be used in the same manner as described above with regard to the cable 301, except that the cable 401 can be broken out to provide twelve connectorizable subcables or cable subunits.

While each of the cable units 100, 200, 300, 400 have been illustrated with twelve optical fibers apiece, such cable units may include more or fewer optical fibers. Also, according to some embodiments, a cable corresponding to the cable 301 or 401 may be formed with more or fewer cable units 300, 400.

According to some embodiments, the cables as described herein meet at least one of the following requirements: GR-409-CORE Issue 1 (issued May 1994), *Generic Requirements for Premises Fiber Optic Cable*; ICEA S-83-596-2001 (issued September 2001), *Standard for Optical Fiber Premises Distribution Cable*; NFPA-262, Revision 2 (issued Jul. 19, 2002), *Standard Method of Test for Flame Travel and Smoke of Wires and Cables for Use in Air-Handling Spaces*; and UL-1666, 4$^{th}$ Edition (issued Jul. 12, 2002), *Test for Flame-Propagation and Smoke-Density Values for Electrical and Optical-Fiber Cables Installed Vertically in Shafts*. According to some embodiments, the cables meet each of the foregoing requirements.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A connectorized cable assembly comprising:
a loose tube optical fiber cable including a plurality of non-buffered optical fibers, a strength member that at least partially surrounds the non-buffered optical fibers and a jacket surrounding the strength member and the non-buffered optical fibers; a first optical fiber connector assembly installed on a first end of the loose tube optical fiber cable; and a second optical fiber connector assembly installed on a second end of the loose tube optical fiber cable; wherein the strength member extends continuously from the first optical fiber connector assembly to the second optical fiber connector assembly and is configured to provide strain relief at both the first and second optical fiber connector assemblies; wherein the plurality of non-buffered optical fibers have a ribbonized configuration within at least part of the first optical fiber connector assembly and within at least part of the second optical fiber connector assembly, and have a loose tube configuration outside the first and second optical fiber connector assemblies; wherein a transition between the loose tube configuration and the ribbonized configuration occurs within the first optical fiber connector assembly.

2. The connectorized cable assembly of claim 1, wherein the non-buffered optical fibers are loose with respect to all optical fibers surrounded by the jacket so that the non-buffered optical fibers have no particular fixed relative orientation.

3. The connectorized cable assembly of claim 1, wherein the first optical fiber connector assembly includes a connector housing and a strain relief boot, and wherein the plurality of optical fibers have a loose configuration in a rear section of the strain relief boot.

4. The connectorized cable assembly of claim 1, wherein the non-buffered optical fibers float within the strength member.

5. The connectorized cable assembly of claim 4, wherein the strength member floats within the jacket.

6. The connectorized cable assembly of claim 1, wherein the strength member completely surrounds the non-buffered optical fibers.

7. A connectorized cable assembly comprising: a loose tube optical fiber cable including: a plurality of loose, non-buffered optical fibers; a strength member at least partially surrounding the non-buffered optical fibers; and a jacket surrounding the strength member and the non-buffered optical fibers; wherein the non-buffered optical fibers are loose with respect to all optical fibers surrounded by the jacket so that they have no particular fixed relative orientation; and an optical fiber connector installed on the loose tube optical fiber cable, wherein the strength member is secured to the optical fiber connector to provide strain relief between the loose tube optical fiber cable and the optical fiber connector; wherein the plurality of non-buffered optical fibers have a ribbonized configuration within at least part of the optical fiber connector, and have a loose tube configuration outside the optical fiber connector; wherein a transition between the loose tube configuration and the ribbonized configuration occurs within the optical fiber connector.

8. The connectorized cable assembly of claim 7, wherein the jacket defines a passage through which the strength member and the non-buffered optical fibers extend and at least 30% of the volume of the passage is not filled by the optical fibers or the strength member.

9. The connectorized cable assembly of claim 8, wherein between about 50 and 60% of the volume of the passage is not filled by the optical fibers or the strength member.

10. The connectorized cable assembly of claim 7, wherein each of the non-buffered optical fibers includes a core, a cladding surrounding the core, and an acrylate coating layer surrounding the cladding.

11. The connectorized cable assembly of claim 10, wherein the coating layers of at least some of the non-buffered optical fibers contact the strength member.

12. The connectorized cable assembly of claim 7, wherein the strength member is directly secured to the optical fiber connector by crimping of the optical fiber connector.

13. The connectorized cable assembly of claim 7, wherein the strength member completely surrounds the non-buffered optical fibers.

14. The connectorized cable assembly of claim 7, wherein the optical fiber connector includes a connector housing and a strain relief boot, and wherein the plurality of optical fibers have a loose configuration in a rear section of the strain relief boot.

\* \* \* \* \*